(12) United States Patent
Chen et al.

(10) Patent No.: US 7,772,808 B2
(45) Date of Patent: Aug. 10, 2010

(54) VOLTAGE REGULATING SYSTEM AND VOLTAGE REGULATOR

(75) Inventors: Chih-Huang Chen, Nan-Tou (TW); Su-Hui Wang, Nan-Tou (TW); Hsin-Hung Wu, Nan-Tou (TW)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 481 days.

(21) Appl. No.: 11/907,414

(22) Filed: Oct. 12, 2007

(65) Prior Publication Data

US 2008/0157726 A1 Jul. 3, 2008

(30) Foreign Application Priority Data

Dec. 29, 2006 (TW) ............................. 95223228 U

(51) Int. Cl.
*H02P 9/00* (2006.01)
*H02P 9/10* (2006.01)

(52) U.S. Cl. .................................... 322/28; 322/29
(58) Field of Classification Search ............. 322/22, 322/25, 28, 29, 59, 99
See application file for complete search history.

(56) References Cited

U.S. PATENT DOCUMENTS

| | | | | |
|---|---|---|---|---|
| 4,386,310 A | * | 5/1983 | Sievers | 322/28 |
| 4,477,766 A | * | 10/1984 | Akita et al. | 322/28 |
| 4,689,545 A | * | 8/1987 | Komurasaki et al. | 322/14 |
| 4,816,736 A | * | 3/1989 | Dougherty et al. | 320/116 |
| 4,831,322 A | * | 5/1989 | Mashino et al. | 322/28 |
| 5,561,363 A | * | 10/1996 | Mashino et al. | 322/25 |
| 6,121,757 A | * | 9/2000 | Takahashi et al. | 322/28 |
| 6,420,855 B2 | * | 7/2002 | Taniguchi et al. | 322/28 |
| 6,734,653 B2 | * | 5/2004 | Taniguchi et al. | 322/24 |
| 6,815,933 B2 | * | 11/2004 | Taniguchi et al. | 322/28 |
| 6,924,629 B1 | * | 8/2005 | Mueller et al. | 322/28 |
| 7,078,881 B2 | * | 7/2006 | Aoyama | 322/28 |
| 7,180,271 B2 | * | 2/2007 | Takahashi et al. | 322/28 |

* cited by examiner

*Primary Examiner*—Nicholas Ponomarenko
(74) *Attorney, Agent, or Firm*—Kile Goekjian Reed & McManus PLLC

(57) ABSTRACT

A voltage regulating system includes a generator, a battery, a warning light, a starting switch, and a voltage regulator. The voltage regulator includes an exciting driver connected to an exciting winding of the generator so as to excite the exciting winding; a voltage built-up/current leakage protection unit connected to a battery and the exciting driver so as to receive a battery voltage and drive the exciting driver for building the output voltage of the generator, while the generator at low speed operation. The voltage regulator further includes an exciting cut-off driver connected to the exciting driver and the voltage built-up/current leakage protection unit so as to cut the exciting driver off in response to the output voltage of the generator built by the voltage built-up/current leakage protection unit.

20 Claims, 6 Drawing Sheets

VOLTAGE REGULATING SYSTEM AND VOLTAGE REGULATOR

BACKGROUND OF THE INVENTION

1. Field of the Invention

The present invention relates to a voltage regulating system that is used in a car and used to regulate the output voltage of a generator, while the generator operates at low speed.

2. Description of Related Art

In general, the generator that is used in a car outputs a voltage according to the operation speed of the car engine. The output voltage of the generator charges a battery and provides power to all electronic devices of the car. Moreover, for petrol cars, the output voltage of the generator provides the current required to run the car engine.

The car usually has a voltage regulator to regulate the output voltage of the generator so as to avoid unstable output voltage. The voltage regulator regulates the output voltage down, while the output voltage is too high, and regulates the output voltage up, while the output voltage is too low. Therefore, the voltage regulator can stabilize the output voltage of the generator so as to provide stable power to every electronic device of the car and to prevent damage of the electronic devices.

FIG. 1 is a circuit diagram of a prior art voltage regulating system. As shown in FIG. 1, a voltage regulator 10 of the voltage regulating system 1 has three terminals A, F and G, wherein terminal A of the voltage regulator 10 connects to the first output terminal T1 of a generator 12, and connects to the second output terminal T2 of the generator 12 via a warning light 14 and a starting switch 15. Moreover, terminals A and F of the voltage regulator 10 connect to an exciting winding 122 of the generator 12, and terminal G of the voltage regulator 10 connects to ground g. The voltage regulating system 1 further includes a battery 13, wherein the positive terminal of the battery 13 connects to the second output terminal T2 of generator 12, and the negative terminal of the battery 13 connects to ground g.

Please refer to FIG. 1 again. The voltage regulator 10 includes a current limit resistor Rb, wherein one terminal of the current limit resistor Rb connects to terminal A of the voltage regulator 10, and another terminal of the current limit resistor Rb connects to the base of a Darlington transistor Q. The collector of the Darlington transistor Q connects to terminal F of the voltage regulator 10 and connects to terminal A of voltage regulator 10 via a Freewheeling diode D1, and the emitter of the Darlington transistor Q connects to terminal G of the voltage regulator 10. Moreover, the voltage regulator 10 further includes a cut-off switch Q2, wherein the cut-off switch Q2 connects the base and the emitter of Darlington transistor Q. Furthermore, the control terminal of cut-off switch Q2 connects to terminal A of the voltage regulator 10 via a Zener diode D2.

Please refer to FIG. 1 again. When the starting switch 15 turns on, the battery 13 supplies the battery voltage to the base of Darlington transistor Q via the warning light 14 and the current limit resistor Rb so as to turn on Darlington transistor Q. Moreover, the battery 13 outputs an exciting current to the exciting winding 122 of generator 12 through the conducting Darlington transistor Q. Then the generator 12 starts to build up the output voltage.

The generator 12 transmits the output voltage to cut-off switch Q2 so as to turn on cut-off switch Q2 after the generator 12 has built up the output voltage. Moreover, the cut-off switch Q2 that is turned on couples the base and the emitter of Darlington transistor Q thus cutting off Darlington transistor Q. According to the non-conduction of Darlington transistor Q, the voltage across the exciting winding 122 is gradually reduced through the Freewheeling diode D1. This causes the output voltage generated by the first output terminal T1 of the generator 12 to drop down, which causes the cut-off switch Q2 to be turned off.

Consequently, the Darlington transistor Q turns on again due to the battery voltage generated by the battery 13 while cut-off switch Q2 is turned off. The conduction of Darlington transistor Q excites the exciting winding 122 of generator 12 so that the output voltage of generator 12 is raised up again.

The disadvantage of this arrangement is that the functionality of voltage regulator 10 depends on the power rating of the warning light 14, which must be about 3 W. When warning lights with a power rating of 2 W or 1.4 W or high light LEDs are used, the exciting current flowing through exciting winding 122 will be too low, and consequently the generator 12 will build up the required output voltage only at high speed of rotation.

SUMMARY OF THE INVENTION

Accordingly, an object of the present invention is to provide a voltage regulator and a voltage regulating system which allows for different power ratings of the warning light and allows to build up the output voltage of a generator while the generator operates at low speed.

The voltage regulating system of the present invention includes a generator having an exciting winding and two output terminals; a battery connected to one output terminal of the generator and outputting a battery voltage; a warning light connected to another output terminal of the generator; a starting switch connected between to the battery and the warning light; a voltage regulator connected to the generator and the battery.

The voltage regulator of the present invention connects to a generator and a battery, wherein the voltage regulator includes an exciting driver and a voltage built-up/current leakage protection unit. The exciting driver connects to an exciting winding of the generator so as to excite the exciting winding. The voltage built-up/current leakage protection unit connects the battery and the exciting driver so as to receive the battery voltage and drive the exciting driver for building the output voltage of the generator, while the generator at low speed operation.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
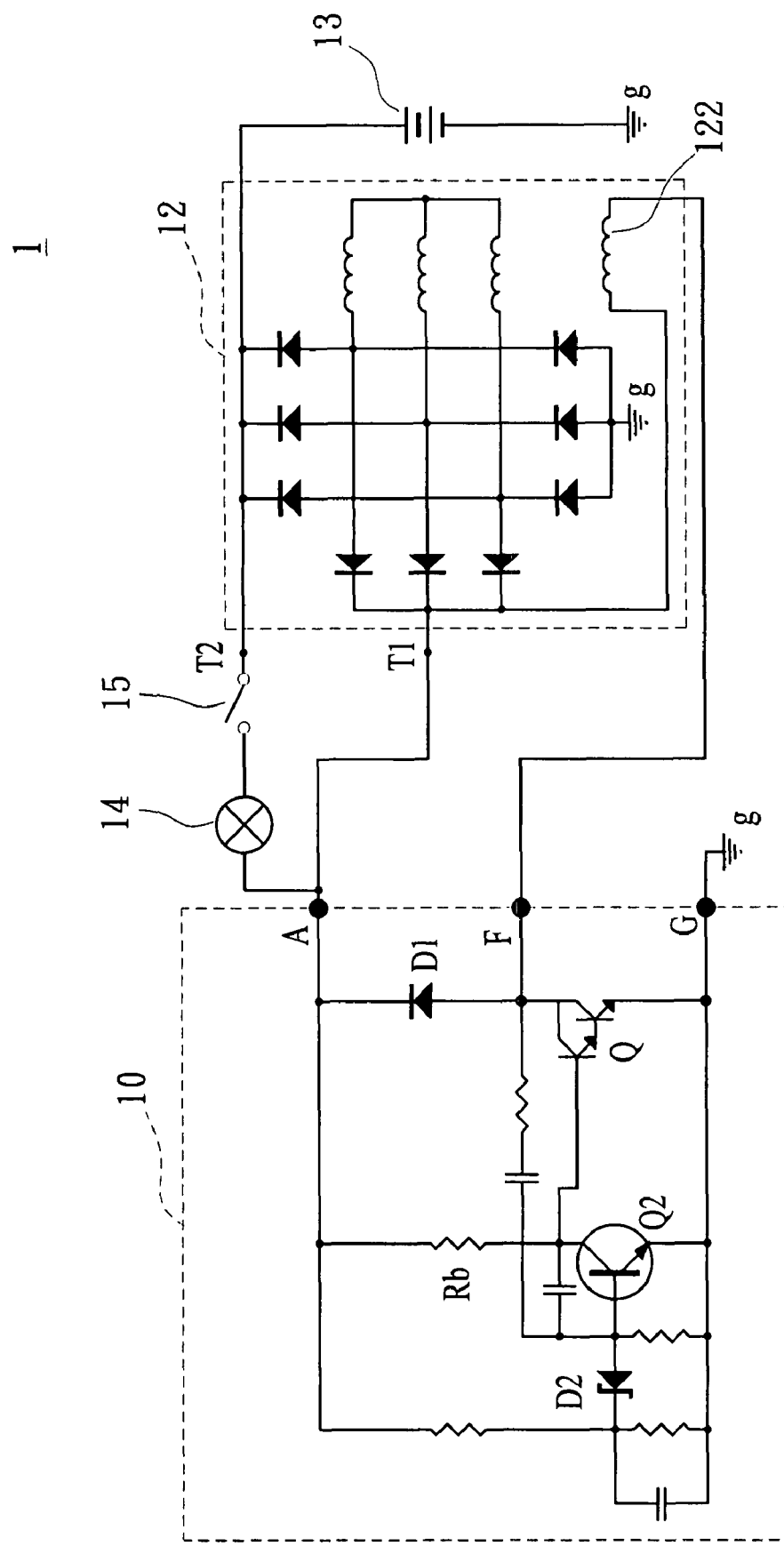
FIG. 1 is a circuit diagram of a prior art voltage regulating system.
Figure 2:
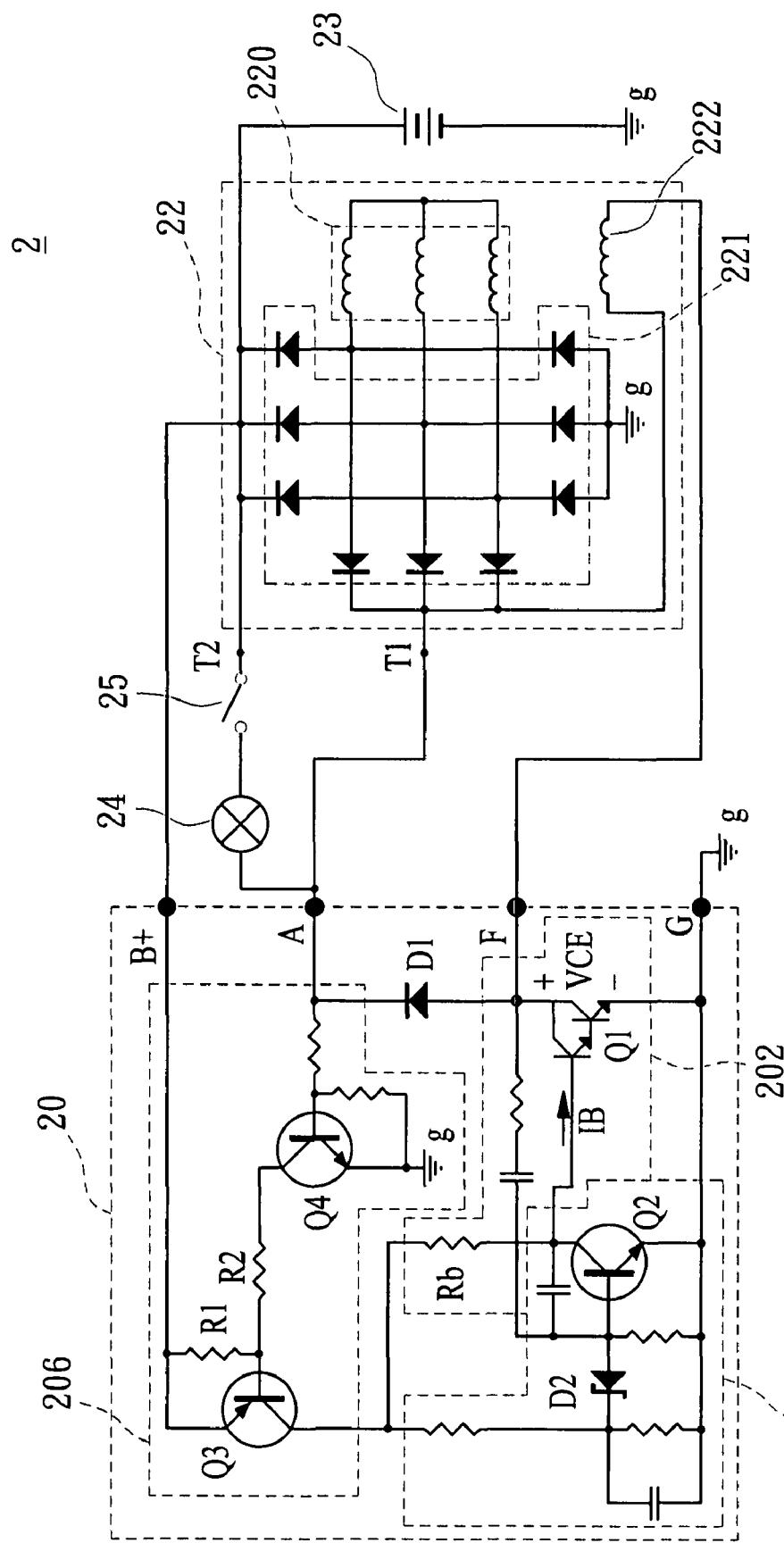
FIG. 2 is a circuit diagram of the voltage regulating system according to a first embodiment of the present invention.

FIG. 2 is a circuit diagram of the voltage regulating system according to a first embodiment of the present invention. The voltage regulating system 2 is used in a car (not shown), which includes a generator 22 having an exciting winding 222 and two output terminals T1, T2; a battery 23 connected to one output terminal T2 of the generator 22; a warning light 24 connected to terminals T1 and T2 of the generator 22; a starting switch 25 connected between the battery 23 and the warning light 24; a voltage regulator 20 connected to generator 22 and battery 23. Moreover, the generator 22 is formed by connecting together an alternator 220 and a rectifier 221. Furthermore, the warning light 24 is a LED in this embodiment.

Please refer to FIG. 2 again. The voltage regulator 20 includes an exciting driver 202, an exciting cut-off driver 204 and a voltage built-up/current leakage protection unit 206. The exciting driver 202 connects to the exciting winding 222 of the generator 22 so as to excite the exciting winding 222. The voltage built-up/current leakage protection unit 206 connects to the battery 23 and the exciting driver 202 so as to receive a battery voltage and drive the exciting driver 202 for building an output voltage of the generator 22 while the generator 22 operates at low speed. The voltage regulator 20 further includes a Freewheeling diode D1, which connects the exciting driver 202 and the voltage built-up/current leakage protection unit 206, and in parallel connects the two ends of exciting winding 222.

Please refer to FIG. 2 again. The exciting driver 202 includes a current limit resistor Rb having two terminals and a power transistor Q1 having a base, a collector and an emitter. Moreover, one terminal of the current limit resistor Rb connects to the voltage built-up/current leakage protection unit 206, and another terminal of the current limit resistor Rb connects to the base of power transistor Q1. The collector of power transistor Q1 connects to exciting winding 222, and the emitter of power transistor Q1 connects to ground g. Furthermore, the power transistor Q1 is a Darlington transistor in this embodiment.

The exciting cut-off driver 204 connects to exciting driver 202 and voltage built-up/current leakage protection unit 206. When the output voltage of generator 22 is built, the output voltage of generator 22 drives the exciting cut-off driver 204 via the voltage built-up/current leakage protection unit 206 to cut off exciting driver 202. The exciting cut-off driver 204 is formed by connecting in series a Zener diode D2 and a cut-off switch Q2.

Please refer to FIG. 2 again. The voltage built-up/current leakage protection unit 206 includes a first transistor Q3, a first resistor R1, a second transistor Q4 and a second resistor R2. Moreover, the collector of the first transistor Q3 connects to the exciting cut-off driver 204, and the emitter of first transistor Q3 connects to the battery 23. The first resistor R1 connects the base and the emitter of first transistor Q3. The base of the second transistor Q4 receives the battery voltage, the emitter of second transistor Q4 connects to ground g, and the collector of second transistor Q4 connects to the base of the first transistor Q3 via the second resistor R2.

Please refer to FIG. 2 again. The voltage regulator 20 has four terminals B+, A, F and G, wherein the terminal A of the voltage regulator 20 connects to the first output terminal T1 of the generator 22, and connects to the second output terminal T2 of the generator 22 via the warning light 24 and starting switch 25. Moreover, terminals A and F of the voltage regulator 20 connect the two ends of exciting winding 222 of generator 22, the terminal G of the voltage regulator 20 connects to ground g, and the terminal B+ of the voltage regulator 20 connects to the battery 23. Furthermore, the positive terminal of battery 23 connects to the second terminal T2 of generator 22, and the negative terminal of the battery 23 connects to ground g.

Please refer to FIG. 2 again. When the starting switch 25 turns on, the battery 23 supplies battery voltage to the base of second transistor Q4 of the voltage built-up/current leakage protection unit 206 via the warning light 24 to turn on the second transistor Q4. The second transistor Q4 that is turned on couples the base of the first transistor Q3 to ground g via the second resistor R2 so as to put the voltage level of the base of the first transistor Q3 to zero, thus turning on the first transistor Q3. The battery 23 further supplies battery voltage to the emitter of first transistor Q3.

The voltage of battery 23 is transmitted to the base of the Darlington transistor Q1 via the conduction of the first transistor Q3 and the current limit resistor Rb so as to turn on the Darlington transistor Q1. Moreover, the battery 23 outputs an exciting current to the exciting winding 222 of generator 22 through the conduction of Darlington transistor Q1. Then the generator 22 starts to build up the output voltage.

According to the above, the battery voltage bypasses the warning light 24 but instead passes through the voltage built-up/current leakage protection unit 206 to the exciting driver 202 so as to turn on the Darlington transistor Q1 by a driving current IB. Moreover, the conduction of the Darlington transistor Q1 has a small collector-emitter voltage VCE, which can generate a large exciting current. The larger exciting current results in the build-up of the output voltage of generator 22 while the generator 22 operates at low speed.

The voltage built-up/current leakage protection unit 206 of the voltage regulator 20 can turn on the Darlington transistor Q1 of the exciting driver 202 fully. Thus, the battery 23 can supply a large exciting current to the exciting winding 222 via the warning light 24, building up the output voltage of generator 22 while the generator 22 operates at low speed. Therefore, the voltage regulating system 2 with the voltage regulator 20 is suitable for use with various warning lights 24 having power ratings such as 3 W, 2 W, 1.4 W, or with a high light LED connected in parallel to a resistor.

The generator 22 transmits the output voltage to the exciting cut-off driver 204 to turn on the cut-off switch Q2 of exciting cut-off driver 204 after the generator 22 has built up the output voltage. The turned on cut-off switch Q2 couples the base and the emitter of Darlington transistor Q1 to cut off Darlington transistor Q1. According to the non-conduction of Darlington transistor Q1, the voltage across the exciting winding 122 is gradually reduced through the Freewheeling diode D1. At this time, the output voltage of the generator 22 drops down and thus turns off the cut-off switch Q2. Thus, the Darlington transistor Q1 turns on again according to the driving current IB generated from the battery 23 while cut-off switch Q2 is turned off. The conduction of Darlington transistor Q1 excites the exciting winding 222 of the generator 22 so as to raise up again the output voltage of generator 22.

Please refer to FIG. 2 again. The voltage built-up/current leakage protection unit 206 is turned off while the car engine is stopped because the voltage at emitter and base of first transistor Q3 is equal. This prevents a leakage current through current limit resistor Rb and avoids power consumption from battery 23.

Figure 3:
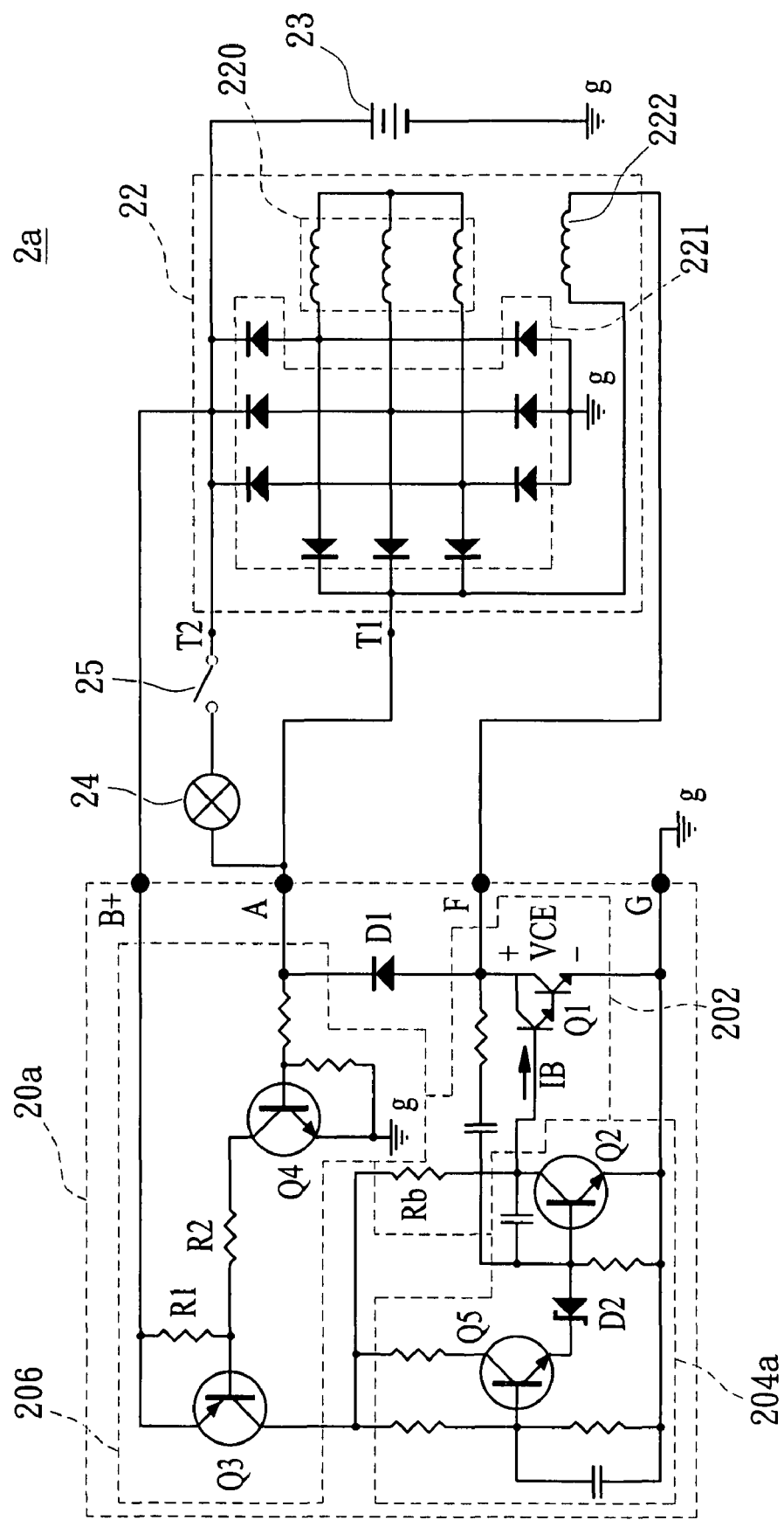
FIG. 3 is a circuit diagram of the voltage regulating system according to a second embodiment of the present invention.

Reference is made to FIG. 3 and FIG. 2. In the second embodiment, components identical to those used in the first embodiment are labelled with the same symbols. The circuit actions and achieved effects of the voltage regulator 20a of the second embodiment are the same as those of the voltage regulator 20 of the first embodiment. The second embodiment differs from the first embodiment only in that the exciting cut-off driver 204a of the second embodiment further includes an auxiliary switch Q5 for enhancing the operating speed of exciting cut-off driver 204a.

Figure 4:
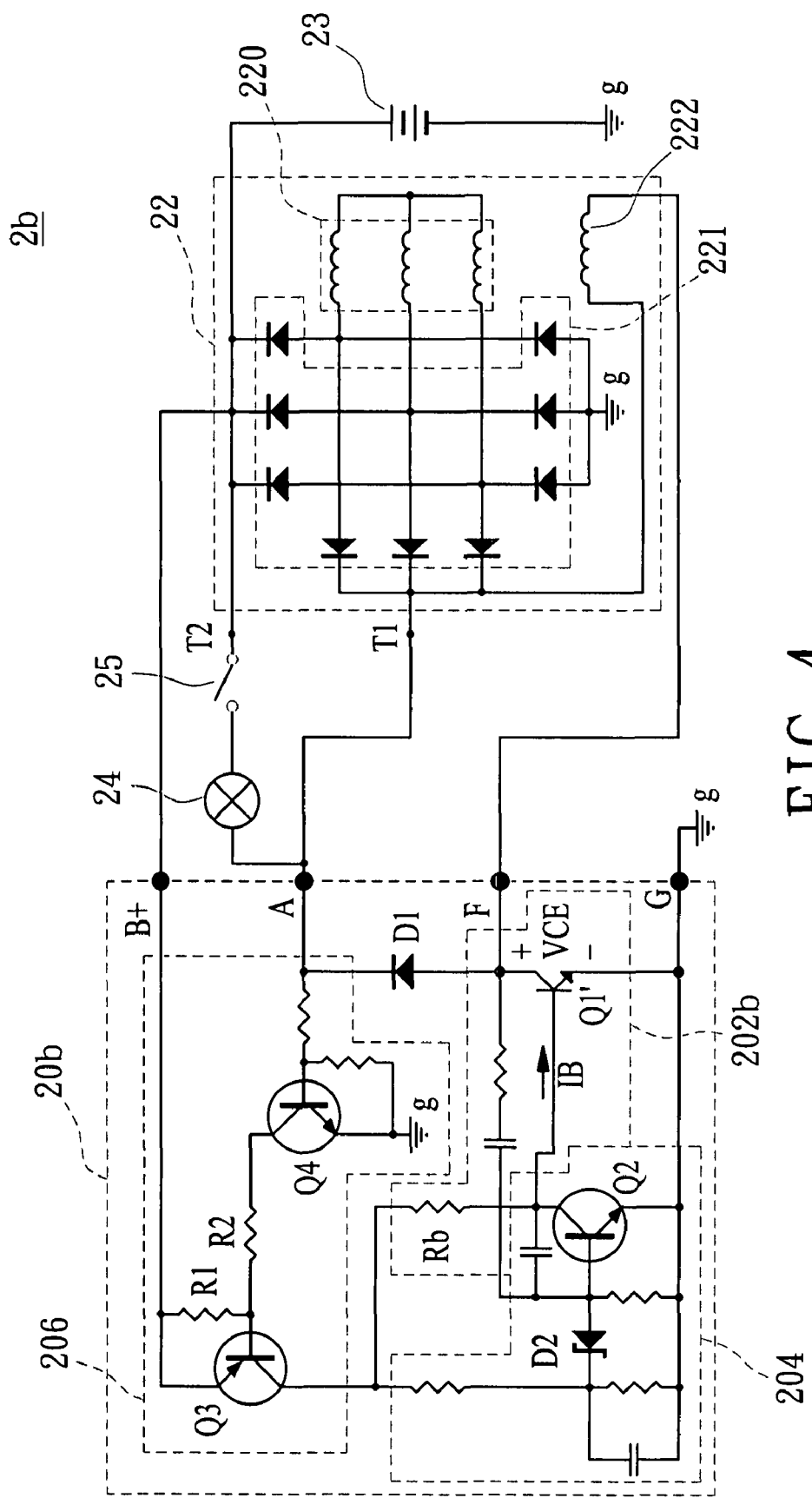
FIG. 4 is a circuit diagram of the voltage regulating system according to a third embodiment of the present invention.

Reference is made to FIG. 4 and FIG. 2. In the third embodiment, components identical to those used in the first embodiment are labelled with the same symbols. The circuit actions and achieved effects of the voltage regulator 20b of the third embodiment are the same as those of the voltage regulator 20 of the first embodiment. The third embodiment differs from the first embodiment only in that the general power transistor Q1' of the third embodiment replaces the Darlington transistor Q1 of the first embodiment.

Figure 5:
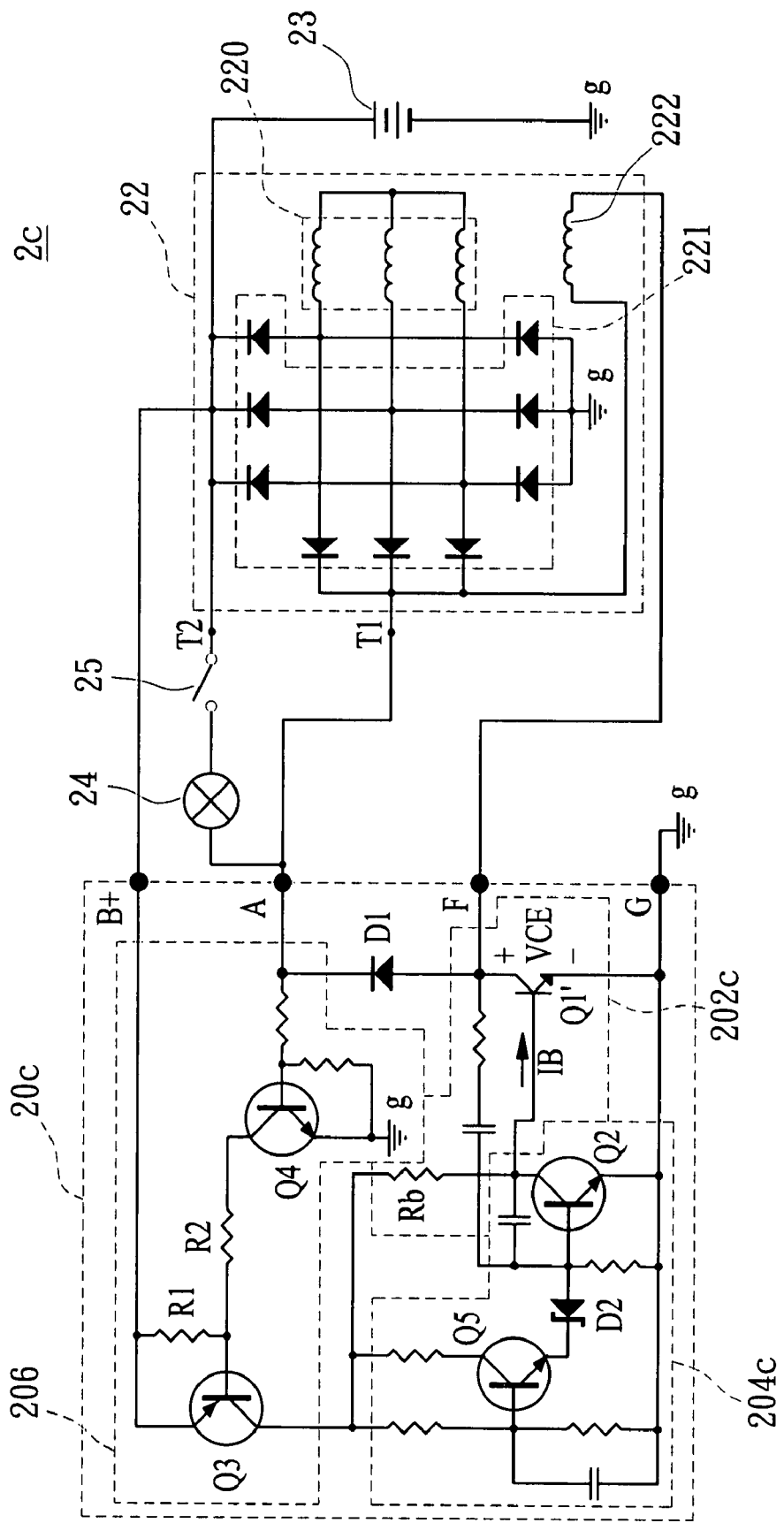
FIG. 5 is a circuit diagram of the voltage regulating system according to a fourth embodiment of the present invention.

Reference is made to FIG. 5 and FIG. 2. In the fourth embodiment, components identical to those used in the first embodiment are labelled with the same symbols. The circuit actions and achieved effects of the voltage regulator 20b of the fourth embodiment are the same as those of the voltage regulator 20 of the first embodiment. The fourth embodiment differs from the first embodiment in that the exciting cut-off driver 204c of the fourth embodiment further includes an auxiliary switch Q5 for enhancing the operative speed of the exciting cut-off driver 204c. Moreover, the general power transistor Q1' of the fourth embodiment replaces the Darlington transistor Q1 of the first embodiment.

Figure 6:
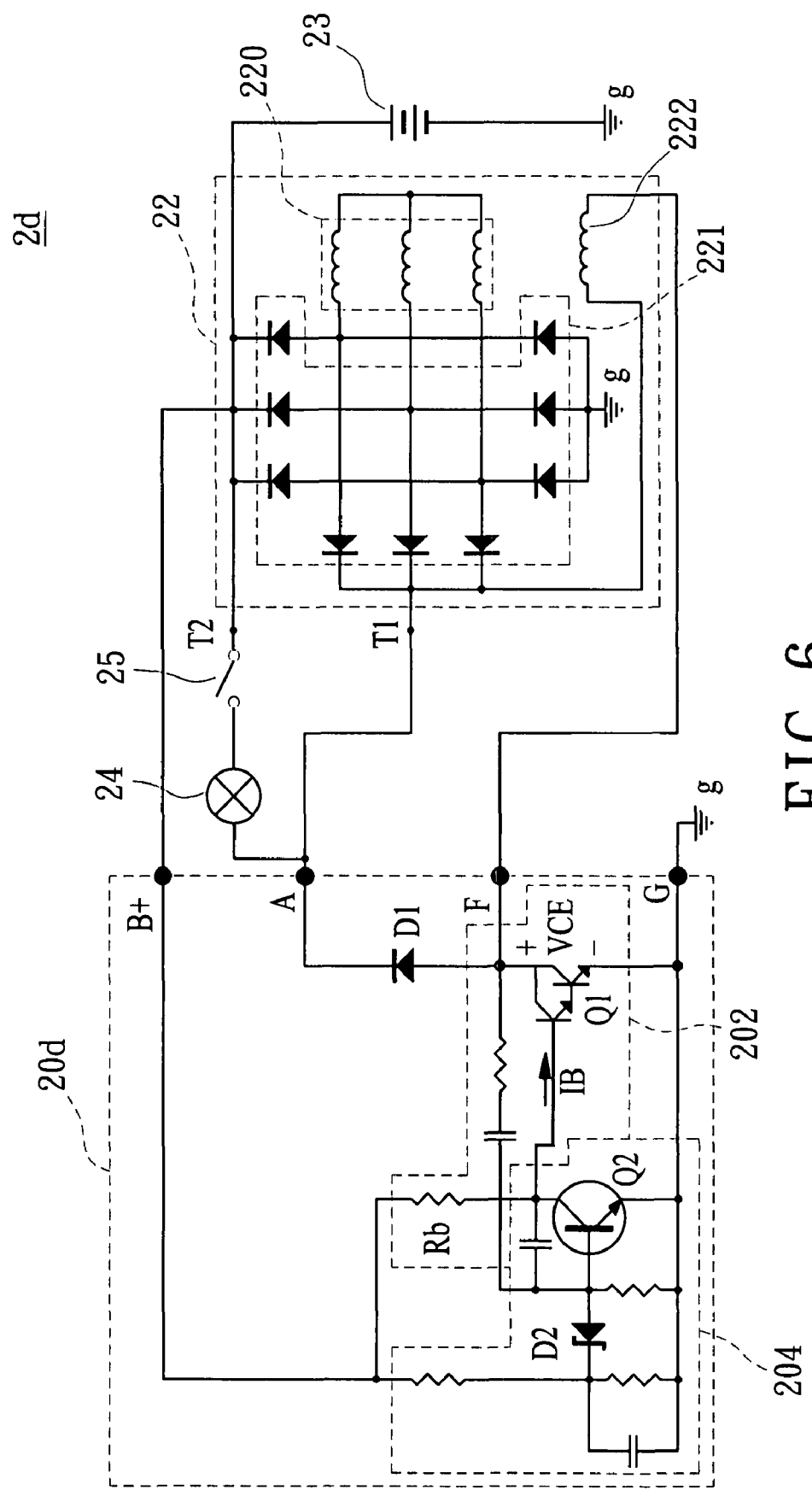
FIG. 6 is a circuit diagram of the voltage regulating system according to a fifth embodiment of the present invention.

Reference is made to FIG. 6 and FIG. 2. In the fifth embodiment, components identical to those used in the first embodiment are labelled with the same symbols. The circuit actions and achieved effects of the voltage regulator 20d of the fifth embodiment are the same as those of the voltage regulator 20 of the first embodiment. The fifth embodiment differs from the first embodiment only in that the voltage built-up/current leakage protection unit 206 is omitted in the fifth embodiment. Thus, in the fifth embodiment, the exciting driver 202 is connected to the battery 23 directly via terminal B+ and the current limit resistor Rb.

To Sum up, the voltage regulator of the present invention includes an exciting driver, an exciting cut-off driver and a voltage built-up/current leakage protection unit. The exciting driver connects to the exciting winding of the generator so as to excite the exciting winding. Moreover, the voltage built-up/current leakage protection unit connects to the battery and the exciting driver so as to receive the battery voltage and drive the exciting driver for building up the output voltage of the generator while the generator operates at low speed. Furthermore, the exciting cut-off driver connects to the exciting driver and the voltage built-up/current leakage protection unit so as to cut the exciting driver off in response to the output voltage of the generator built by the voltage built-up/current leakage protection unit.

Therefore, the voltage regulator of the present invention has the advantages of allowing the usage of warning lights of different power ratings and enabling the generator to build up the output voltage at low operating speed.

Although the present invention has been described with reference to the preferred embodiment, it shall be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A voltage regulator connected to a generator and a battery, comprising:

an exciting driver connected to an exciting winding of the generator for exciting the exciting winding; and a voltage built-up/current leakage protection unit connected to the battery and the exciting driver for receiving a battery voltage and driving the exciting driver so as to built an output voltage of the generator while the generator operates at low speed.

2. The voltage regulator as claimed in claim 1, further comprising a freewheeling diodeconnected to the exciting winding in parallel.

3. The voltage regulator as claimed in claim 1, wherein the exciting driver comprises:

a current limit resistor having two ends, wherein one end of the current limit resistor connects to the voltage built-up/current leakage protection unit; and a power transistor having a base, a collector and an emitter, wherein the base of the power transistor connects to the other end of the current limit resistor, the collector of the power transistor connects to the exciting winding, and the emitter of the power transistor connects to a ground.

4. The voltage regulator as claimed in claim 3, wherein the power transistor is a Darlington transistor.

5. The voltage regulator as claimed in claim 2, further comprising an exciting cut-off driver, wherein the exciting cut-off driver connects to the exciting driver and the voltage built-up/current leakage protection unit for cutting the exciting driver off in response to the output voltage of the generator built by the voltage built-up/current leakage protection unit.

6. The voltage regulator as claimed in claim 5, wherein the voltage built-up/current leakage protection unit comprises:

a first transistor having a base, a collector and an emitter, wherein the collector of the first transistor connects to the exciting cut-off driver, the emitter of the first transistor connects to the battery;

a first resistor connecting the base of the first transistor and the emitter of the first transistor;

a second transistor having a base, a collector and an emitter, wherein the base of the second transistor receives the battery voltage, the emitter of the second transistor connects to the ground; and a second resistor connecting the base of the first transistor and the collector of the second transistor.

7. The voltage regulator as claimed in claim 1, wherein the generator is composed of an alternator and a rectifier.

8. A voltage regulating system, comprising:

a generator having an exciting winding and two output terminals;

a battery connected to one output terminal of the generator and outputting a battery voltage;

a warning light connected between the two output terminals of the generator;

a starting switch connected between to the battery and the warning light;

a voltage regulator connected to the generator and the battery, wherein the voltage regulator comprises:

an exciting driver connected to the exciting winding of the generator for exciting the exciting winding; and a voltage built-up/current leakage protection unit connected to the battery and the exciting driver for receiving the battery voltage and driving the exciting driver so as to build an output voltage of the generator while the generator operates at low speed.

9. The voltage regulating system as claimed in claim 8, further comprising a freewheeling diode, wherein the freewheeling diode is connected to the exciting winding in parallel.

10. The voltage regulating system as claimed in claim 8, wherein the exciting driver comprises:
- a current limit resistor, wherein one terminal of the current limit resistor connects to the voltage built-up/current leakage protection unit; and
- a power transistor having a base, a collector and an emitter, wherein the base of the power transistor connects to another terminal of the current limit resistor, the collector of the power transistor connects to the exciting winding, the emitter of the power transistor connects to a ground.

11. The voltage regulating system as claimed in claim 10, wherein the power transistor is a Darlington transistor.

12. The voltage regulating system as claimed in claim 9, further comprising an exciting cut-off driver, wherein the exciting cut-off driver connects to the exciting driver and the voltage built-up/current leakage protection unit for cutting the exciting driver off response to the output voltage of the generator built by the voltage built-up/current leakage protection unit.

13. The voltage regulating system as claimed in claim 12, wherein the voltage built-up/current leakage protection unit comprises:
- a first transistor having a base, a collector and an emitter, wherein the collector of the first transistor connects to the exciting cut-off driver, the emitter of the first transistor connects to the battery;
- a first resistor connecting the base of the first transistor and the emitter of the first transistor;
- a second transistor having a base, a collector and an emitter, wherein the base of the second transistor receives the battery voltage, the emitter of the second transistor connects to ground; and
- a second resistor connected between to the base of the first transistor and the collector of the second transistor.

14. The voltage regulating system as claimed in claim 8, wherein the warning light is an LED.

15. The voltage regulating system as claimed in claim 8, wherein the generator is composed of an alternator and a rectifier.

16. A voltage regulator connected to a generator and a battery, comprising:
- an exciting driver connected to an exciting winding of the generator for exciting the exciting winding so as to build an output voltage of the generator while the generator operates at low speed, wherein the exciting driver comprises:
  - a current limit resistor, wherein one terminal of the current limit resistor connects to the battery for receiving a battery voltage; and
  - a power transistor having a base, a collector and an emitter, wherein the base of the power transistor connects to another one terminal of the current limit resistor, the collector of the power transistor connects to the exciting winding, the emitter of the power transistor connects to a ground.

17. The voltage regulator as claimed in claim 16, further comprising a freewheeling diode, wherein the freewheeling diode is connected to the exciting winding in parallel.

18. The voltage regulator as claimed in claim 16, wherein the power transistor is a Darlington transistor.

19. The voltage regulator as claimed in claim 16, further comprising an exciting cut-off driver, wherein the exciting cut-off driver connects to the exciting driver and the battery for cutting the exciting driver off response to the output voltage of the generator.

20. The voltage regulator as claimed in claim 16, wherein the generator is composed of an alternator and a rectifier.

* * * * *